US008890657B2

(12) United States Patent
Lin et al.

(10) Patent No.: US 8,890,657 B2
(45) Date of Patent: Nov. 18, 2014

(54) SYSTEM AND METHOD FOR OPERATING AN RFID SYSTEM WITH HEAD TRACKING

(75) Inventors: Lang Lin, Potomac, MD (US); Joe White, Woodbine, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 627 days.

(21) Appl. No.: 12/609,423

(22) Filed: Oct. 30, 2009

(65) Prior Publication Data

US 2011/0102149 A1 May 5, 2011

(51) Int. Cl.
H04Q 5/22 (2006.01)
G08B 13/14 (2006.01)
G05D 1/00 (2006.01)
G06K 9/00 (2006.01)
G02B 26/08 (2006.01)
G06K 7/10 (2006.01)
G06K 7/00 (2006.01)
G06F 3/01 (2006.01)
G06K 17/00 (2006.01)

(52) U.S. Cl.
CPC .......... *G06K 7/0008* (2013.01); *G06K 7/10079* (2013.01); *G06K 2017/0045* (2013.01); *G06F 3/012* (2013.01)
USPC ... 340/10.1; 340/10.3; 340/572.1; 340/539.1; 701/2; 235/462.17; 235/44; 235/462.22

(58) Field of Classification Search
USPC .................................. 340/10.1, 572.1, 539.1
See application file for complete search history.

(56) References Cited

U.S. PATENT DOCUMENTS

| 6,184,847 | B1 * | 2/2001 | Fateh et al. ..................... 345/8 |
| 6,570,487 | B1 | 5/2003 | Steeves |
| 6,842,106 | B2 | 1/2005 | Hughes et al. |
| 6,842,774 | B1 * | 1/2005 | Piccioni ..................... 709/207 |
| 7,128,270 | B2 | 10/2006 | Silverbrook et al. |
| 7,142,120 | B2 | 11/2006 | Charych et al. |
| 7,195,173 | B2 | 3/2007 | Powell et al. |
| 7,221,269 | B2 * | 5/2007 | Onderko et al. ......... 340/539.13 |
| 7,274,909 | B2 | 9/2007 | Pertillä et al. |
| 7,315,522 | B2 | 1/2008 | Wood, Jr. |
| 7,327,251 | B2 | 2/2008 | Corbett, Jr. |
| 7,412,898 | B1 | 8/2008 | Smith et al. |
| 7,497,384 | B2 | 3/2009 | Powell et al. |
| 7,554,447 | B2 | 6/2009 | Cox |
| 7,580,678 | B2 | 8/2009 | Byman-Kivivuori et al. |
| 7,606,533 | B2 | 10/2009 | Pertillä et al. |

(Continued)

FOREIGN PATENT DOCUMENTS

| JP | 2008236651 A | 10/2008 |
| WO | 2006119563 A1 | 11/2006 |
| WO | 2009013646 A2 | 1/2009 |

OTHER PUBLICATIONS

Johnny Chung Lee, "Head Tracking for Desktop VR Displays using the WiiRemote", Dec. 21, 2007, [retrieved on Oct. 29, 2009]; Retrieved from internet: <URL: http://www.youtube.com/watch?v=Jd3-eiid-Uw>.

(Continued)

*Primary Examiner* — Fekadeselassie Girma

(57) ABSTRACT

A method of transmitting radiofrequency identification (RFID) interrogation signals is disclosed. The method comprises detecting a first movement of a user in a first direction, determining a command from the first movement, and transmitting a RFID interrogation signal in response to the command.

21 Claims, 12 Drawing Sheets

(56) References Cited

U.S. PATENT DOCUMENTS

| | | | |
|---|---|---|---|
| 7,625,314 B2 | 12/2009 | Ungari et al. | |
| 7,650,017 B2 * | 1/2010 | Yamada | 382/107 |
| 7,650,095 B2 | 1/2010 | Fuqua et al. | |
| 7,652,577 B1 * | 1/2010 | Madhow et al. | 340/572.1 |
| 7,658,694 B2 | 2/2010 | Ungari | |
| 7,667,572 B2 | 2/2010 | Husak et al. | |
| 7,667,575 B2 | 2/2010 | Husak et al. | |
| 7,692,532 B2 | 4/2010 | Fischer et al. | |
| 7,755,469 B2 | 7/2010 | Sung et al. | |
| 7,760,095 B2 | 7/2010 | Murrah | |
| 7,817,014 B2 | 10/2010 | Krishna et al. | |
| 7,873,326 B2 | 1/2011 | Sadir | |
| 7,878,945 B2 | 2/2011 | Ungari et al. | |
| 7,887,459 B2 | 2/2011 | Ungari et al. | |
| 7,917,594 B2 | 3/2011 | Reding et al. | |
| 7,920,827 B2 | 4/2011 | Huomo et al. | |
| 7,928,844 B2 | 4/2011 | Mackenzie et al. | |
| 7,961,098 B2 | 6/2011 | Kanagala et al. | |
| 7,991,644 B2 | 8/2011 | Bryant et al. | |
| 8,135,354 B2 | 3/2012 | Duron et al. | |
| 8,159,329 B1 | 4/2012 | Killian et al. | |
| 8,174,365 B2 | 5/2012 | Akiyama et al. | |
| 8,279,112 B2 | 10/2012 | Carrick | |
| 8,425,313 B2 | 4/2013 | Nelson et al. | |
| 8,430,749 B2 | 4/2013 | Nelson et al. | |
| 8,446,254 B2 | 5/2013 | Carrick et al. | |
| 8,477,013 B2 | 7/2013 | Sarma et al. | |
| 8,519,823 B2 | 8/2013 | Rinkes | |
| 8,674,810 B2 | 3/2014 | Uysal et al. | |
| 2004/0002305 A1 | 1/2004 | Byman-Kivivuori et al. | |
| 2004/0087273 A1 | 5/2004 | Perttila et al. | |
| 2004/0190092 A1 | 9/2004 | Silverbrook et al. | |
| 2004/0203944 A1 | 10/2004 | Huomo et al. | |
| 2004/0243519 A1 | 12/2004 | Perttila et al. | |
| 2004/0266481 A1 * | 12/2004 | Patel et al. | 455/558 |
| 2005/0113138 A1 * | 5/2005 | Mendolia et al. | 455/558 |
| 2006/0022800 A1 | 2/2006 | Krishna et al. | |
| 2006/0022801 A1 | 2/2006 | Husak et al. | |
| 2006/0022815 A1 | 2/2006 | Fischer et al. | |
| 2006/0044112 A1 * | 3/2006 | Bridgelall | 340/10.1 |
| 2006/0052109 A1 * | 3/2006 | Ashman et al. | 455/440 |
| 2006/0128408 A1 | 6/2006 | Perttila et al. | |
| 2006/0170565 A1 | 8/2006 | Husak et al. | |
| 2006/0206582 A1 | 9/2006 | Finn | |
| 2007/0069851 A1 | 3/2007 | Sung et al. | |
| 2007/0096909 A1 * | 5/2007 | Lally | 340/572.1 |
| 2007/0117623 A1 | 5/2007 | Nelson et al. | |
| 2007/0194945 A1 | 8/2007 | Atkinson | |
| 2007/0200712 A1 | 8/2007 | Arneson et al. | |
| 2007/0236335 A1 | 10/2007 | Aiouaz et al. | |
| 2007/0271113 A1 | 11/2007 | Nelson et al. | |
| 2008/0012689 A1 | 1/2008 | Liu et al. | |
| 2008/0100439 A1 | 5/2008 | Rinkes | |
| 2008/0136681 A1 * | 6/2008 | Jeong et al. | 341/22 |
| 2008/0191845 A1 | 8/2008 | Strzelczyk | |
| 2008/0224825 A1 | 9/2008 | Nystrom et al. | |
| 2008/0243853 A1 | 10/2008 | Reding et al. | |
| 2008/0269016 A1 | 10/2008 | Ungari et al. | |
| 2008/0269017 A1 | 10/2008 | Ungari | |
| 2009/0009332 A1 | 1/2009 | Nunez et al. | |
| 2009/0051485 A1 | 2/2009 | Corry et al. | |
| 2009/0058606 A1 * | 3/2009 | Munch et al. | 340/10.1 |
| 2009/0058820 A1 | 3/2009 | Hinckley | |
| 2009/0079565 A1 | 3/2009 | Mackenzie et al. | |
| 2009/0079571 A1 | 3/2009 | Calvarese | |
| 2009/0121026 A1 * | 5/2009 | Druker et al. | 235/462.44 |
| 2009/0222149 A1 * | 9/2009 | Murray et al. | 701/2 |
| 2009/0237223 A1 | 9/2009 | Zimmerman et al. | |
| 2009/0243969 A1 * | 10/2009 | Matsubara et al. | 345/8 |
| 2009/0322489 A1 * | 12/2009 | Jones et al. | 340/10.3 |
| 2010/0007496 A1 | 1/2010 | Orlassino | |
| 2010/0035724 A1 | 2/2010 | Ungari et al. | |
| 2010/0039237 A1 | 2/2010 | Radhakrishnan et al. | |
| 2010/0041517 A1 | 2/2010 | Ungari et al. | |
| 2010/0109844 A1 | 5/2010 | Carrick et al. | |
| 2010/0109903 A1 | 5/2010 | Carrick | |
| 2010/0127875 A1 | 5/2010 | Wong | |
| 2010/0205541 A1 | 8/2010 | Rapaport et al. | |
| 2010/0207738 A1 * | 8/2010 | Bloy | 340/10.3 |
| 2010/0211431 A1 | 8/2010 | Lutnick et al. | |
| 2010/0304684 A1 | 12/2010 | Duron et al. | |
| 2011/0043373 A1 | 2/2011 | Best et al. | |
| 2011/0084811 A1 | 4/2011 | Park et al. | |
| 2011/0109452 A9 | 5/2011 | Kanagala et al. | |
| 2011/0200023 A1 | 8/2011 | Murray et al. | |
| 2011/0285502 A1 | 11/2011 | Steinmetz et al. | |
| 2012/0094683 A1 | 4/2012 | Yoeli | |
| 2012/0119883 A1 | 5/2012 | Bekritsky | |
| 2012/0127976 A1 | 5/2012 | Lin et al. | |

OTHER PUBLICATIONS

PCT International Search Report Dated Feb. 2, 2011.
PCT International Search Report Dated Feb. 6, 2012 for Related U.S. Appl. No. 12/953,078.
International Preliminary Report on Patentability and Written Opinion for counterpart International Patent Application No. PCT/US2010/052129 issued on May 1, 2012.
International Preliminary Report on Patentability and Written Opinion for related counterpart International Patent Application No. PCT/US2010/058345 issued on Jun. 5, 2012.
Non-Final Office Action mailed Jul. 9, 2013 in U.S. Appl. No. 12/953,078, Lang Lin, filed Nov. 23, 2010.
Final Office Action mailed Oct. 23, 2013 in U.S. Appl. No. 12/953,078, Lang Lin, filed Nov. 23, 2010.
Non-Final Office Action mailed Dec. 20, 2013 in U.S. Appl. No. 12/953,078, Lang Lin, filed Nov. 23, 2010.
Notice of Allowance mailed on Apr. 4, 2014 in U.S. Appl. No. 12/953,078, Lang Lin, filed on Nov. 23, 2010.

* cited by examiner

SYSTEM AND METHOD FOR OPERATING AN RFID SYSTEM WITH HEAD TRACKING

TECHNICAL FIELD

Embodiments of the subject matter described herein relate generally to RFID interrogation and information presentation systems. More particularly, embodiments of the subject matter relate to operating such systems using head tracking techniques.

BACKGROUND

Radiofrequency identification (RFID) systems are frequently used to determine information associated with nearby items, such as units of merchandise. For example, if each unit of merchandise is equipped with an RFID tag identifying the model and/or serial number of the item, an RFID interrogation can determine the number and type of each unit within range, including the serial numbers of the nearby units.

RFID interrogation signals are transmitted to a region by a radio antenna. Some RFID units, referred to as RFID readers, comprise a radio antenna and architecture to operate the radio antenna to both transmit RFID interrogation signals as well as receive response signals from nearby RFID tags. RFID readers can be portable devices, enabling a user to travel while performing RFID operations. For example, a user in a warehouse can use a RFID reader to locate a palette containing a particular model of merchandise.

Manipulation of the RFID reader can require the user to manipulate a stylus or keypad or other input device on the mobile unit. Mobile units are frequently diminutive in size to aid portability, which can include proportionally smaller input interfaces. Accordingly, input can require fine motor coordination to operate the mobile unit to perform the desired functions without errant or inadvertent input entry. Additionally, some facilities contain fixed RFID equipment, such as RFID antennas associated with specified physical regions. Mobile units can be configured to interoperate with the fixed RFID equipment. Such interaction typically requires commands be input into the mobile reader using the same fine motor skills.

BRIEF SUMMARY

A method of transmitting radiofrequency identification (RFID) interrogation signals is disclosed. The method comprises detecting a first movement of a user in a first direction, determining a command from the first movement, and transmitting a RFID interrogation signal in response to the command.

A radiofrequency identification (RFID) communication system is also disclosed. The RFID communication system comprises a wireless transceiver comprising a first wireless antenna adapted to transmit RFID interrogation signals, and a sensor assembly. The sensor assembly comprises a sensor adapted to detect movements made by a user of the RFID communication system and to transmit a first signal conveying information indicating a first movement made by the user, and a processing architecture adapted to receive the first signal and to instruct the first wireless antenna to transmit a RFID interrogation signal in response to receiving the first signal.

A method of transmitting radiofrequency identification (RFID) interrogation signals is also disclosed. The method comprises detecting a head movement of a user that is indicative of a direction, transmitting a RFID interrogation signal in the direction, receiving a RFID response signal conveying identification information, determining contextual information associated with the identification information, and presenting the contextual information to the user.

A method of displaying radiofrequency identification (RFID) response information is also disclosed. The method comprises transmitting a first RFID interrogation signal at a first signal strength, receiving a first RFID response signal conveying first identification information, transmitting a second RFID interrogation signal at a second signal strength, the second signal strength greater than the first signal strength, receiving the first RFID response signal and a second RFID response signal, the second RFID response signal conveying second identification information, presenting the first and second identification information to a user, detecting a head movement by the user, determining a gesture command from the head movement, and adjusting the presented first and second identification information in response to the gesture command.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
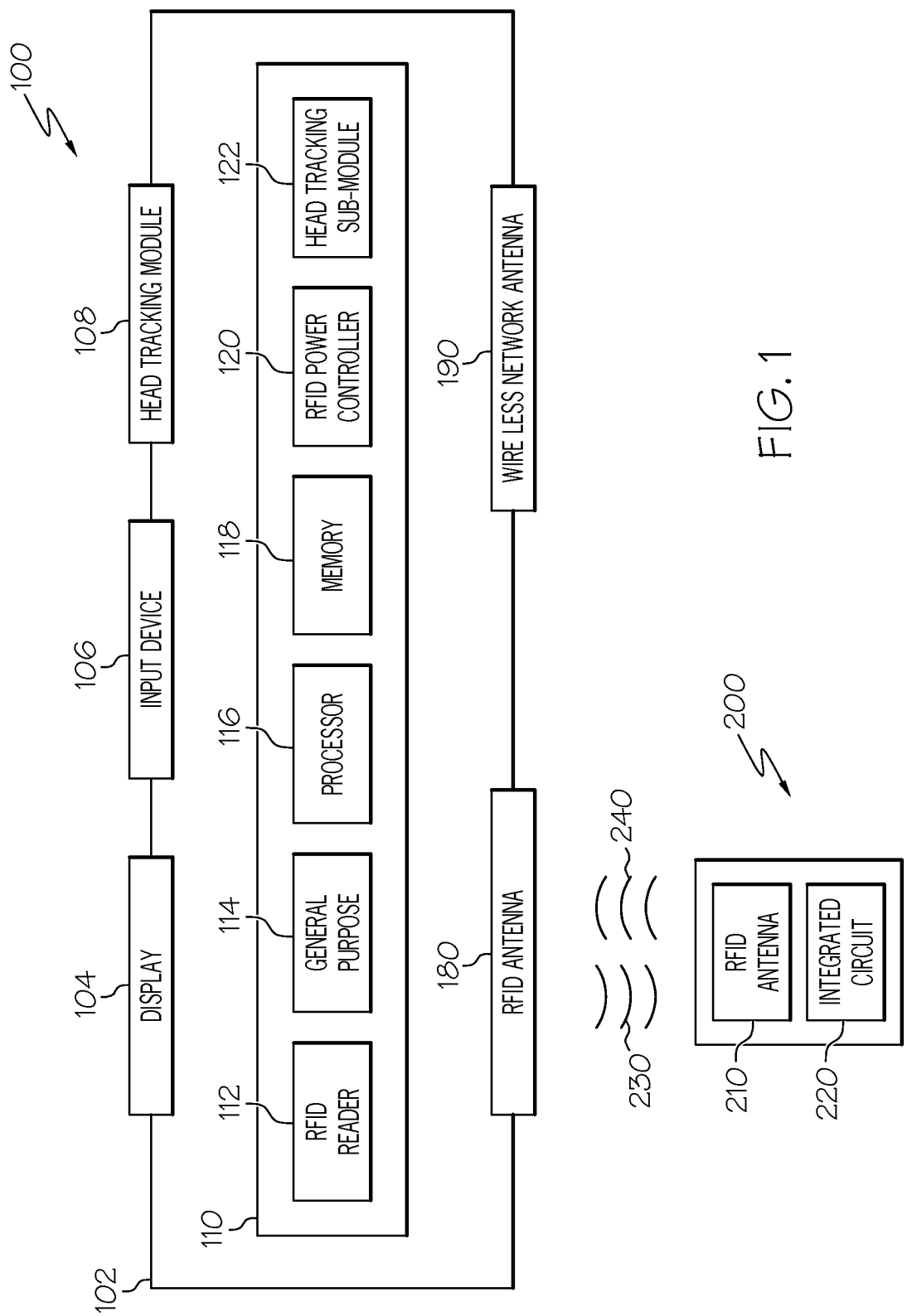
FIG. 1 is a schematic of an embodiment of a portable RFID reader and exemplary nearby RFID tag.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques related to radio-frequency identification (RFID) data transmission, RFID system architectures, computing device architectures, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. For example, although the schematic shown in FIG. 1 depicts one example arrangement of elements such as processing devices, additional intervening elements, devices, features, or components may be present in an embodiment of the invention.

Briefly, the techniques and technologies described herein leverage the use of head tracking techniques with RFID equipment, such as mobile readers and fixed readers. Other applications of the methods and systems disclosed herein are also possible. A user may use an off-the-shelf RFID reader, whether or not the reader is operatively coupled to a personal computer (PC), a tablet computer, mobile computing device, such as a personal data assistant (PDA), or the like. Such a computer or computing device can run one or more suitably configured software applications. Similarly, although one technique for tracking the orientation and/or position of a user's head is shown, other techniques can also be used.

Head tracking techniques can be used to ascertain movement of the head of a user of an RFID device, such as a portable RFID reader. The head movements can be used to convey commands to the RFID reader, such as to steer the direction of an RFID interrogation signal, or adjust the strength of the signal. Additionally, head tracking can be used in conjunction with fixed RFID equipment to direct RFID interrogation signals to regions of interest to the user, as indicated by the orientation of the user's head.

FIG. 1 is a schematic representation of an RFID reader 100, which is configured in accordance with an exemplary embodiment, communicating with an exemplary RFID tag 200. Although called a RFID reader, the device can perform a variety of functions in addition to those described. Additionally, various other features and functions, such as its portability and receptors for performing head tracking operations, are described below. Accordingly, while the RFID reader 100 can perform RFID interrogation functions, it can also perform other functions as well. Thus, the RFID reader 100 is depicted in an oversimplified manner, and a practical embodiment can include many additional features and components. The RFID reader 100 generally includes a housing 102, a display element 104 that is visible from the outside of the housing 102, one or more input features, such as the input device 106 that is accessible from the outside of the housing 102, a head tracking module 108, which can comprise one or more components within, or extending through the housing 102, an electronics module 110 contained within the housing 102, and a RFID antenna 180 and a wireless network antenna 190 (both which can be, but are not necessarily, contained within the housing 102). The input device 106 is preferably a keypad, though the RFID reader 100 can also include a touch panel or other input/output elements.

The display 104 and input device 106 function as input/output elements for the operator of the RFID reader 100. The display 104 and input device 106 can be coupled to the electronics module 110 as necessary to support input/output functions in a conventional manner. The electronics module 110 represents the hardware components, logical components, and software functionality of the RFID reader 100. In practical embodiments, the electronics module 110 can be physically realized as an integrated component, board, card, or package mounted within the housing 102. As depicted in FIG. 1, the electronics module 110 can be coupled to the RFID and wireless network antennas 180, 190 using suitable techniques. For example, the electronics module 110 and the RFID antenna 180 can be connected via an RF cable and RF connector assemblies.

The head tracking module 108 can comprise one or more optical emitters or sensors adapted to cooperate with the head tracking sub-module 122 to perform head tracking operations as described in greater detail below. For example, the head tracking module 108 can comprise one or more light emitting diodes (LEDs) which transmit visible light or non-visible light, such as infrared radiation. Alternatively, in some embodiments, the head tracking module 108 can comprise one or more sensors adapted to detect visible and non-visible light, such as infrared or ultraviolet radiation. The exact number, size, and type of emitter or sensor can vary between embodiments. The operation of the head tracking module 108 is described in greater detail below.

The electronics module 110 may generally include a number of sub-modules, features, and components configured to support the functions described herein. For example, the electronics module 110 may include an RFID reader sub-module 112, a general purpose sub-module 114, at least one processor 116, memory 118, an RFID power controller sub-module 120, and a head tracking sub-module 122. The distinct functional blocks of FIG. 1 are useful for purposes of description. In a practical embodiment, the various sub-modules and functions need not be distinct physical or distinct functional elements. In other words, these (and other) functional modules of the RFID reader 100 may be realized as combined processing logic, a single application program, or the like.

The RFID reader sub-module 112 is suitably configured to support RFID functions of the RFID reader 100. In this regard, the RFID reader sub-module 112 can include an RFID reader transceiver that generates RFID interrogation signals and receives reflected RFID signals generated by RFID tags in response to the interrogation signals, also referred to as response signals. In the example embodiment described herein, the RFID reader sub-module 112 is designed to operate in the UHF frequency band designated for RFID systems. Alternate embodiments may instead utilize the High Frequency band or the Low Frequency band designated for RFID systems. The operation of RFID readers and RFID transceivers are generally known and, therefore, will not be described in detail herein. Notably, in this example embodiment, the RFID reader sub-module 112 is operable at various power levels, as controlled by the RFID power controller sub-module 120, and can operate the RFID antenna 180 to operate in certain directions. The RFID power controller sub-module 120 can adjust the power of transmission of interrogation signals transmitted by the RFID antenna 180. Interrogation signals can be adjusted to reach varying distances from the RFID reader 100 as a result. Further description of the use of interrogation signals transmitted with varied power levels and in controlled directions is provided below. The RFID power controller sub-module 120 can be embodied separately, or integrated with one or more other sub-modules, such as the general purpose sub-module 114.

The general purpose sub-module 114 is responsible for handling non-RFID functions of the RFID reader 100, as needed. For example, the general purpose sub-module 114 may include a wireless data communication element that supports bi-directional wireless data transfer using suitable wireless data transmission protocols and methodologies. In such a deployment, the RFID antenna 180 may be tuned to avoid RF interference with the wireless data communication elements. Alternatively (or additionally), the general purpose sub-module 114 can be configured to support data communication over physical connections and through the wireless network antenna 190. In certain embodiments, the wireless network antenna 190 can be omitted, and non-RFID wireless communication can occur through operation of the RFID antenna 180.

As another example, the general purpose sub-module 114 may be configured to support data capture functions of RFID reader 100, where such data capture functions include one or more of: bar code reading; imaging; magnetic stripe reading; GPS data receiving; and IrDA. These data capture modes can be utilized to support traditional uses of the RFID reader 100, e.g., inventory control, tracking of packages, retail checkout, rental car returns, and other applications. Although not separately depicted in FIG. 1, the RFID reader 100 may include a data capture sub-module that is configured to support such data capture modes. Of course, the RFID antenna 180 may also be tuned to avoid RF interference with the data capture sub-module.

The processor 116 can be any general purpose microprocessor, controller, or microcontroller that is suitably configured to control the operation of the RFID reader 100. In practice, the processor 116 executes one or more software applications that provide the desired functionality for the RFID reader 100, including the operating features described in more detail below. The memory 118 may be realized as any processor-readable medium, including an electronic circuit, a semiconductor memory device, a ROM, a flash memory, an erasable ROM, a floppy diskette, a CD-ROM, an optical disk, a hard disk, an organic memory element, or the like. As an example, the memory 118 is capable of storing RFID data captured by the RFID reader 100.

The head tracking sub-module 122 is preferably capable of performing operations controlling the head tracking module 108 and processing of information therefrom. For example, the head tracking sub-module 122 can operate the head tracking module 108 to emit light from one or more LEDs. In other embodiments, the head tracking sub-module 122 can receive information from the head tracking module 108, such as signals from a sensor or sensors. Other components can cooperate with the head tracking sub-module 122 to perform these and related tasks, such as the processor 116 and memory 118, for example.

A RFID reader, such as the one described above, preferably is capable of functioning in one or more alternate modes, including the RFID reader mode. The primary functions of the RFID reader need not be limited to data capture and RFID tag interrogation. Rather, the RFID reader can be capable of multi-tasking and multi-functioning. Some functions, such as a bar-code scanner and alternate manual input interfaces, can also be present. In some embodiments, the RFID reader 100 can be a single device, while in others, multiple devices can combine various features to accomplish the functions listed above, and others desired for or necessary to the embodiment. A RFID reader, such as the one described above, is preferably used as in conjunction with the systems and methods described below.

An exemplary RFID tag 200 is also illustrated in FIG. 1. The RFID tag 200 comprises a RFID antenna 210 and an integrated circuit 220. The RFID antenna 210 is preferably capable of receiving and transmitting RF signals. The integrated circuit 220 represents one or more modules cooperating to store and process information, including processes for modulating and demodulating a RF signal.

The RFID antenna 180 is capable of transmitting an interrogation signal 230. The exemplary RFID tag 200 can be positioned within transmission range of the RFID reader 100. Accordingly, the RFID tag 200 can receive the interrogation signal 230 with its RFID antenna 210. The integrated circuit 220 can perform one or more operations in response, including modulating the interrogation signal 230. After modulation, the interrogation signal 230 can be transmitted from tag 200 with its RFID antenna 210 as a response signal 240. The RFID reader 100 can receive the response signal 240, and extract useful information from it, as conveyed by the RFID tag 200. Such use information includes, but is not limited to, the identity of the tag 200.

The interrogation signal 230 is received by RFID tags within a certain region or zone. This region or zone is referenced as the interrogation field and is characterized by sufficient signal strength for an RFID tag within the field to provide a response signal. The size and shape of the region in which the interrogation signal 230 can be received is determined by the direction and strength of the transmitted interrogation signal 230. For example, an interrogation signal can have relatively weak signal strength. In such an event, only RFID tags near the RFID reader 100 would receive the interrogation signal. Alternatively, an interrogation signal transmitted with relatively strong signal strength might be received by RFID tags more distant from the RFID reader 100. Similarly, directional antennas can be used to adjust the location of the region to which the interrogation signal is transmitted.

Figure 2:
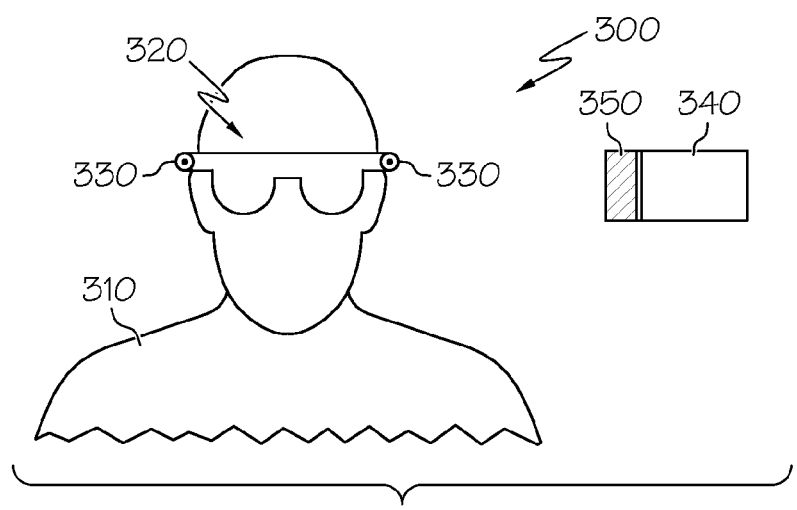
FIG. 2 is a diagram of an embodiment of a head-tracking system.

FIG. 2 illustrates an exemplary head tracking system 300 and a user 310 of the apparatus. The head tracking system 300 comprises a head-mounted visor 320, worn by the user 310. The visor 320 can be similar to eyeglasses, whether lenses are present or not. The visor 320 is not limited to an eyeglass frame, and can be any shape worn by the user 310 which performs the features and functions described below. Thus, in some embodiments, the visor 320 can be an eyeglass frame where the lenses are tinted for protection of the user's 310 eyes. In other embodiments, the visor 320 can incorporate heads up display (HUD) technology, which can interface with the RFID equipment described below. The visor 320 can be a wireframe support, or any combination or modification of these devices useful in the embodiment.

Preferably at least two emitters 330 are coupled to the visor 320. The emitters 330 can be LEDs, such as LEDs which emit visible light, as well as non-visible light, including infrared spectrum radiation. Preferably the emitters 330 are spaced apart, such as on either side of the head of the user 310, as shown. In certain embodiments, a single emitter can be used. Preferably when a single emitter is present, the emissions have an aspect sufficient to determine the profile of the head of the user 310 relative to a sensor, as described below. In those embodiments where more than one emitter is used, such as the illustrated embodiment, the distance between them preferably is sufficient to permit profile determination by observing the distance between the emitters.

The emitters 330 can be placed near the temple of the user 310, as shown, or in other positions on and around the head of the user 310, as appropriate for the embodiment. The emitters 330 preferably face in a forward direction, relative to the user 310, but other orientations can be used by systems adapted to expect alternate facing.

The head tracking system 300 can also include a tracking device 340 which comprises a sensor 350. The tracking device 340 can be any piece of equipment adapted to determine the head position and orientation of the user 310 from information provided from the sensor 350. Thus, the tracking device 340 can perform features and operations in addition to head tracking. One such multifunctional tracking device 340 can be the RFID reader 100 described above, although other tracking device embodiments can be stationary or fixed, larger or smaller, or perform other functions and features than the RFID reader 100.

The sensor 350 is preferably an optical sensor adapted to detect the position of the emitters 330 relative to the tracking device 340. Thus, in one exemplary embodiment, the sensor 350 can be an optical sensor adapted to sense infrared light from the emitters 330. In other embodiments, the sensor 350 can be an optical sensor adapted to sense visible light, ultraviolet radiation, or other emitted information. In certain embodiments, non-electromagnetic radiation detecting sensors can be used when paired with appropriate emitters. For example, in some embodiments, sonic emitters can be used, while a sonic sensor is present in the tracking device 340. Thus, the emitters 330, tracking device 340, and sensor 350 are not constrained to any particular medium of information exchange, but rather are selected as desired and appropriate for the embodiment of the head tracking system 300 being employed.

FIGS. 3-6 illustrate several operating conditions of the head tracking system 300. Throughout, reference is made to the left emitter 332, relative to the perspective of the user 310, an emitted phenomena, such as the left light beam 334, the right emitter 336, and right emitted phenomena, the right light beam 338. Although described as light beams, the left and right emitted phenomena can be omnidirectional broadcasts of light, such as infrared light, or other electromagnetic radiation, and the like, as previously described.

Figure 3:
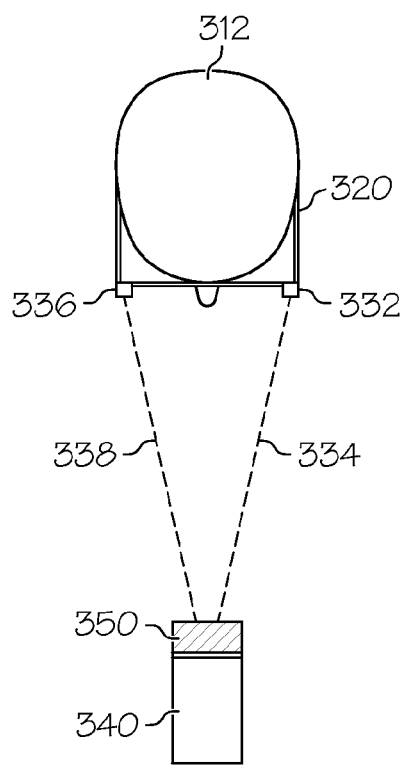
FIG. 3 is a diagram of the embodiment of FIG. 2 in a first orientation.

In FIG. 3, the head 312 of the user 310 is positioned facing the tracking device 340. The left and right light beams 334, 338 are received by the sensor 350. From observation of the positioning of the sources of the left and right light beams 334, 338, namely, the left and right emitters 332, 336, the tracking device 340 can determine various characteristics of the present state of the head 312. For example, in conjunction with a gravitational gyroscope or other gravitational accelerometer or sensor, the head tracking device can determine whether the left and right emitters 332, 336 are on the same level relative to the surface of the Earth. Thus, the tracking device 340 can determine the angle of incline of the head 312 from positioning of the emitters 332, 336.

When the tracking device 340 has a priori knowledge of the fixed distance between the emitters 332, 336 on the visor 320, it can determine the distance between the emitters 332, 336 and the tracking device 340. The tracking device can observe a distance between the emitters 332, 336. From the observed distance, or apparent distance, the tracking device 340 can determine the distance the visor 320 must be from the sensor 350.

Figure 4:
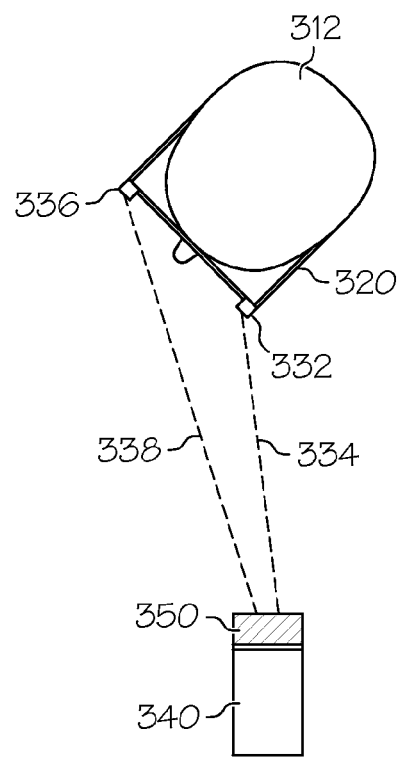
FIG. 4 is a diagram of the embodiment of FIG. 3 in another orientation.

As shown in FIG. 4, the user 310 can turn her head 312 to the user's 310 right. The motion of the head 312 causes the visor 320 to also orient toward the user's 310 right. Consequently, the emitters 332, 336 will change position relative to each other. When the user 310 turns her head far enough, one emitter, such as the right emitter 336, may be occluded by her head 312. However, by observing the apparent motion of the emitters 332, 336 through information received by the sensor 350, the tracking device 340 can determine the head movement of the user 310. As can be seen, the emitted light beams 334, 338 will travel different paths for reception by the sensor 350 than those of FIG. 3. For example, the apparent distance between the emitters 332, 336 will be reduced. Further, the tracking device 340 can observe the apparent motion of the emitters 332, 336 during the turn of the head 312 to determine the direction and speed of rotation of the head 312.

Figure 5:
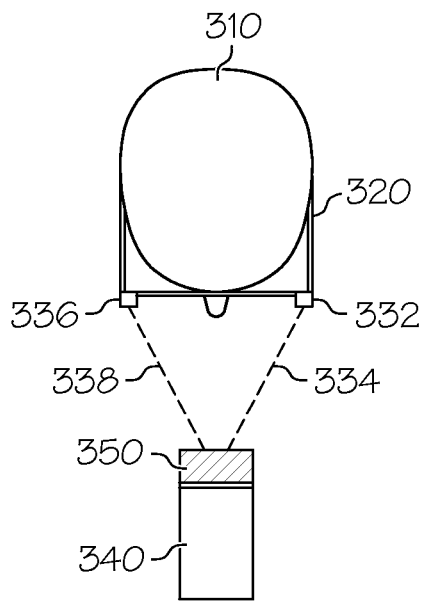
FIG. 5 is a diagram of the embodiment of FIG. 2 in a first position.
Figure 6:
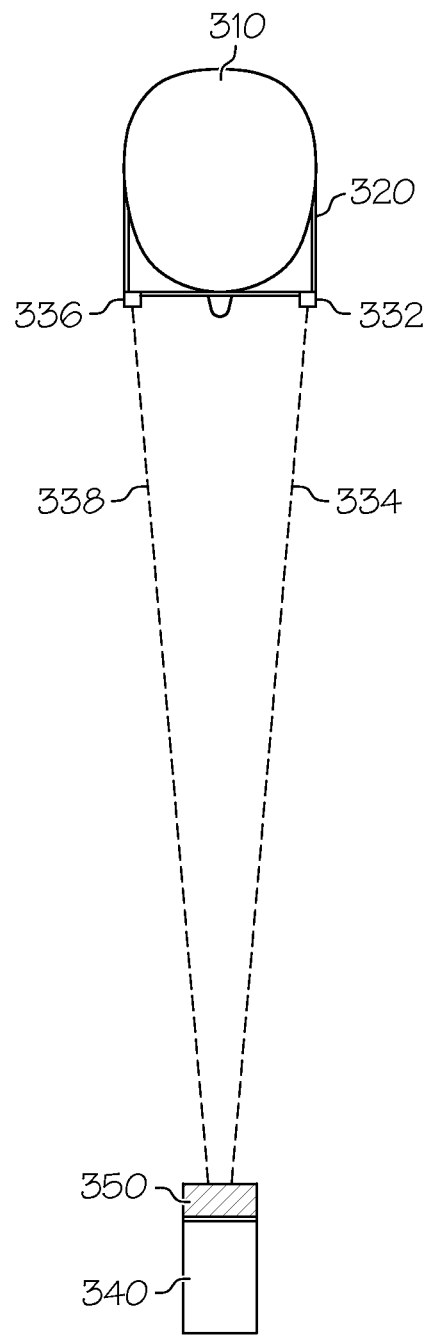
FIG. 6 is a diagram of the embodiment of FIG. 5 in a second position.

As shown in FIG. 5, the visor 320 can be moved toward the tracking device 340. The apparent distance between the emitters 332, 336 will increase as the visor 320 is moved toward the tracking device 340. By determining, such as through calculation or observation, the speed of approach of the visor 320, the tracking device 340 can determine the motion of the head 312. For example, if the head 312 moves from the position shown in FIG. 5 to that shown in FIG. 6, the tracking device 340 can observe the recession of the visor 320. The apparent distance between the emitters 332, 336 will appear to decrease as the visor 320, and accordingly, the head 312 move back from the tracking device 340.

The tracking device 340 can perform two or more of the determinations described above simultaneously, thereby tracking the visor 320 in multiple directions. For example, by observing the position and motion of the emitters 332, 336, the tracking device 340 can determine the motion of the head 312. Thus, the tracking device 340 can observe the emitters 332, 336 to determine the direction and speed of movement or rotation of the head 312 of the user 310.

A mobile or portable RFID device, such as the RFID reader 100 described above perform the described operations to tracking the movement of the head of a user of the RFID reader 100. Thus, the sensor 350 can correspond to the head tracking module 108. Similarly, the head tracking sub-module 122 can perform operations, including cooperative inter-operation with other desired components of the RFID reader 100, resulting in the availability of information concerning the motion of the user's head for operations described in greater detail below.

Although some operations of a head tracking system 300 have been described, other operations are also possible. As different embodiments of the head tracking system 300 can have differently-operating components to accomplish the same operations, similarly, the operational steps can be different to produce the desired results. Thus, while some possible techniques for head tracking have been described, other techniques can also be used without deviating from the spirit of the embodiment.

For example, rather than using predetermined and fixed information for observations, some head tracking techniques can be accomplished by performing relative operations. Thus, although some embodiments of the head tracking system 300 determine the distance of the visor 320 from the tracking device 340 through knowledge of the distance between emitters 332, 336 and observing an apparent distance, some embodiments can use relative motion for informing operations. That is, rather than determining the exact position of the head 312, some embodiments of the head tracking system 300 can instead determine the change in position relative to an arbitrary starting position for head movements. Although the exact distance is not determined, the fact of the user's head movement is determined, including its direction and orientation. Rather than determining two end points for the head, the head tracking system 300 can determine the path of travel of the head.

Gesture commands can be observed using head tracking techniques, such as those described above. For example, a user can turn his head to the right. Such a movement can be a gesture command. Similarly, an upward movement of the head, such as by elevating the neck, or similar movement can constitute a gesture command. Complex head movements, such as a rotation of the head coupled with a change in angle upward or downward can be a gesture command. Similarly, repeated movements, such as three upward head movements, can also constitute gesture commands. The scope of head movements or turns which can be considered gesture commands is limited only by the range of gestures which can be determined by the head tracking system used in an embodiment. Gesture commands can be determined through head tracking techniques and used for input into a variety of systems, including RFID systems, as described below. Thus, a RFID reader, such as the one described above, can user head tracking components and techniques to receive input from the user.

Figure 7:
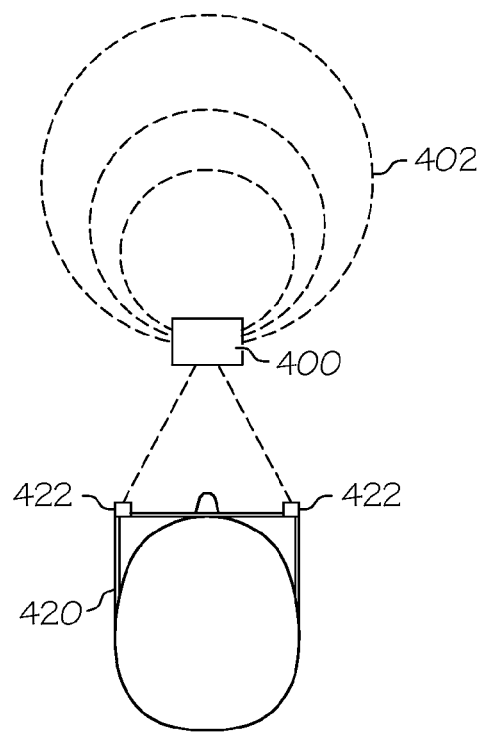
FIG. 7 is a diagram of an embodiment of a RFID reader in a first state.
Figure 8:
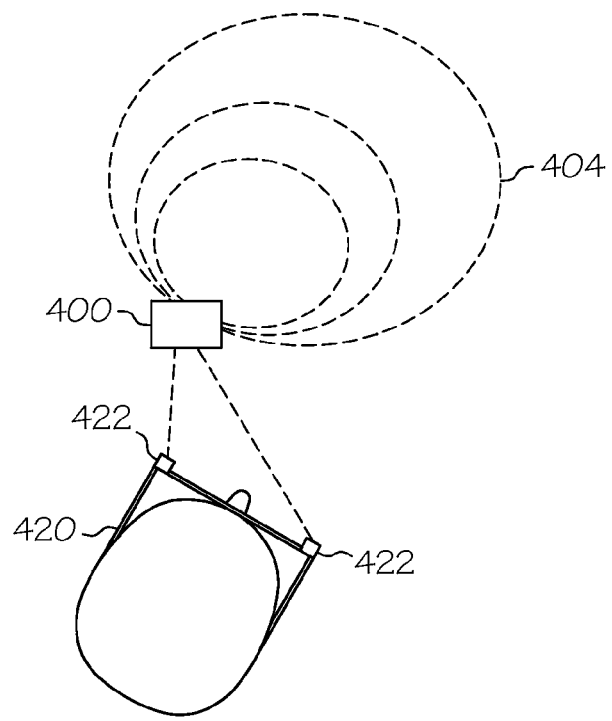
FIG. 8 is a diagram of the embodiment of FIG. 7 in a second state.

FIGS. 7 and 8 illustrate one technique for operating a RFID device 400 using head tracking techniques. As shown in FIG. 7, a user can be operating a RFID reader 400 which uses head tracking techniques to determine the direction, motion, and position of the user's head. The user is wearing a visor 420 with emitters 422 similar to those described above. As can be seen in FIG. 7, the user can operate the RFID device 400 to transmit an interrogation signal, shown as the interrogation field 402.

As shown in FIG. 8, a user can turn his head to the right. The motion of the visor 420 can be observed by the RFID reader 400. In response, the RFID reader 400 can adjust the interrogation field 402 to the adjusted interrogation field 404. The adjusted interrogation field 404 can be steered to the right of the user in response to the turn of the user's head to the right. Similarly, a left turn of the head by the user could cause the RFID reader 400 to adjust an interrogation field to increased size to the user's left.

If desired, opposing movements could be used too. Thus, a turn of the user's head to the right might result in an interrogation field of increased size to the user's left. Other spatial directions can be used as well. For example, in some modes of operation, a movement of the user's head upward could result in an upwardly-shaped interrogation field from the RFID reader 400, and so on, without limit.

Figure 9:
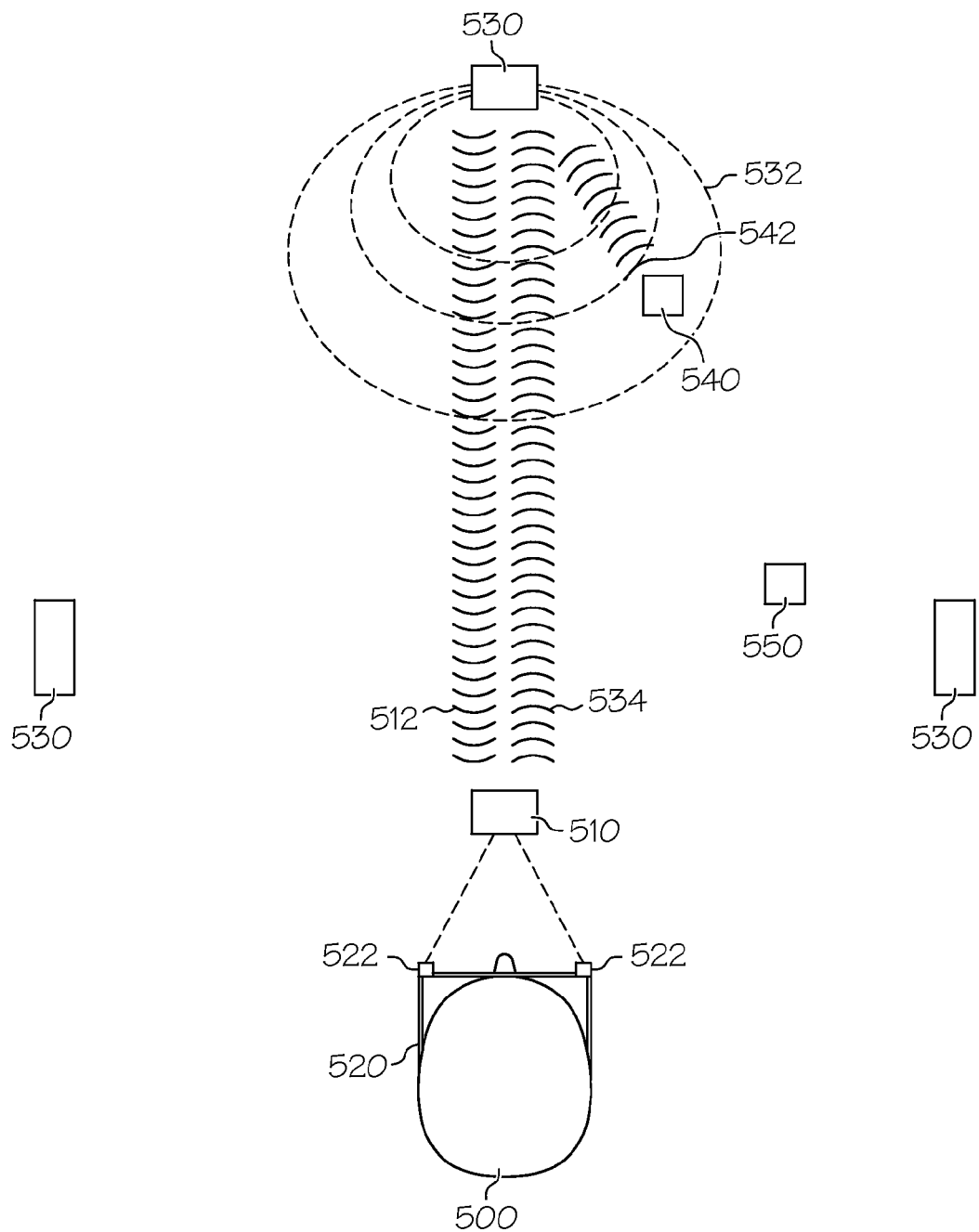
FIG. 9 is a diagram of an embodiment of a mobile unit and nearby fixed RFID equipment operating in a first state.
Figure 10:
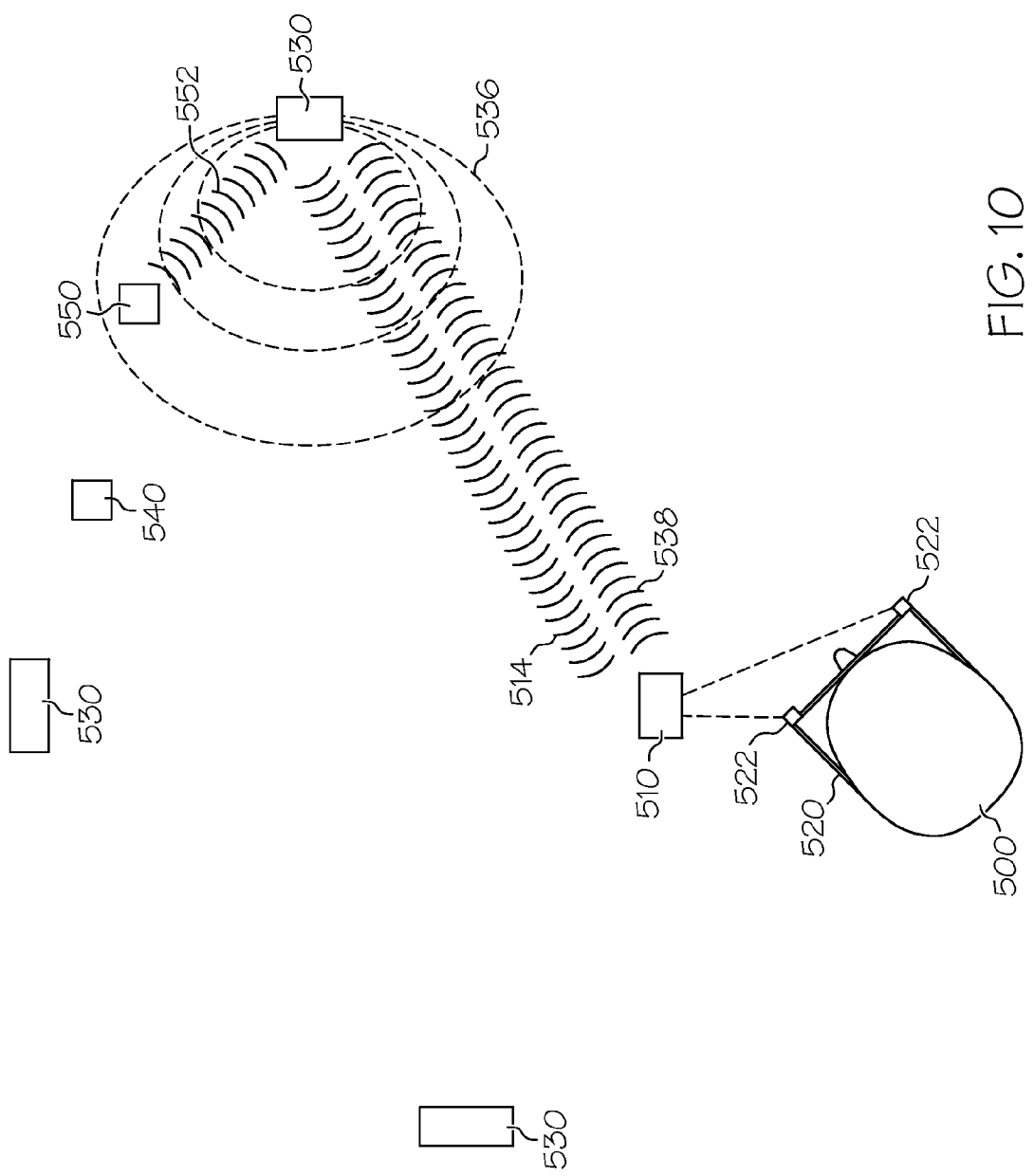
FIG. 10 is a diagram of the embodiment of FIG. 9 operating in a second state.

FIGS. 9 and 10 illustrate a technique for using head tracking to operate fixed RFID equipment. A user 500 can operate a RFID reader or mobile device 510 while wearing a visor 520 with emitters 522, similar to those described above. The user 500 can be in proximity to one or more fixed RFID readers 530. Unlike the mobile device 510, the fixed RFID readers 530 are coupled to stationary objects or fixtures, such as walls, shelving devices, palettes, pedestals, and so on. The fixed RFID readers 530 can also be freestanding stationary devices, if appropriate or desired for the embodiment.

The fixed RFID readers 530 can be isolated units, or can communicate with other devices, including the mobile device 510 using wireless or wired communication techniques. In some embodiments, the fixed RFID readers 530 can be coupled to remote information systems and networks. Such remote systems can include computing devices, including database information storage systems. The fixed RFID readers 530 can perform at least those functions and operations described above with respect to the RFID reader 100, and can include additional components to perform other functions as well.

The mobile device 510 can interoperate with the fixed RFID readers 530 to exchange information, such as through wireless signals. In one embodiment, the mobile device 510 can determine its location from such sources as gyroscopic dead-reckoning, GPS positioning, tracking by stationary devices, or any other suitable technique. By determining the position of the head of the user 500 using head-tracking techniques, the mobile device 510 can determine nearby fixed RFID readers for interoperation. Such information can be stored internally, or can be provided through wireless communication with remote information systems.

By tracking the direction of the head of the user 500, the mobile device 510 can communicate with an appropriate fixed RFID reader 530 to operate it to perform RFID operations, such as transmitting an interrogation signal. Thus, in FIG. 9, the user 500 is facing the central fixed RFID reader 530. The mobile device 510 can determine the fixed RFID reader 530 the user 500 is facing using head tracking techniques combined with information regarding the location and orientation of the mobile device 510. The mobile device 510 can transmit a first signal 512. The first signal 512 can be directional toward the appropriate fixed RFID reader 530, or omnidirectional and contain information indicating the fixed RFID reader 530 for intended interoperation. After receiving the first signal 512, the central fixed RFID reader 530 can transmit a first interrogation signal 532. A first RFID tag 540 within the interrogation field of the central fixed RFID reader 530 can return a first response signal 542. Subsequently, a second signal 534 can be transmitted from the central fixed RFID reader 530 to the mobile device 510. The second signal 534 can convey information obtained from the first response signal 542, or other information regarding the RFID operations performed by the central fixed RFID reader 530.

FIG. 10 illustrates a subsequent event wherein the user 500 has turned her head to the right. The mobile device 510 can determine the fact of this movement and new position of the user's 500 head through use of techniques described above. As shown, the head of the user 500 can orient to the user's right, facing the right fixed RFID reader 530. Accordingly, the mobile device 510 can send a third signal 514, as described above. In response to the third signal 514, the right fixed RFID reader 530 can transmit a second interrogation signal 536 to a second interrogation field. A second RFID tag 550 disposed within the second interrogation field can receive the second interrogation signal 536 and send a second response signal 552. The fixed RFID reader 530 can then transmit a fourth signal 538 to the mobile device 510, providing information. Such information can include the fact of the response from the second RFID tag 550, and information conveyed in the second response signal 552.

Accordingly, the location of the first and second RFID tags 540, 550 can be differentiated through the use of different fixed RFID readers 530 corresponding to different positions of the head of the user 500. Such a position change of the head can constitute a gesture command, the detection or determination of which can instruct the mobile device 510 to undertake one or more operations, such as those described above.

In certain embodiments, the fixed RFID readers 530 can include head tracking components which can observe the position of the head of the user 500, including those embodiments in which the user 500 wears a visor or other tracking aid. In some embodiments, instead of receiving information from the mobile device 510, a fixed RFID reader 530 can perform RFID operations, including RFID interrogation when it determines the user has oriented her head toward the particular fixed reader. Information obtained from RFID operations can be returned to the mobile device 510 for presentment to the user as described above.

Figure 11:
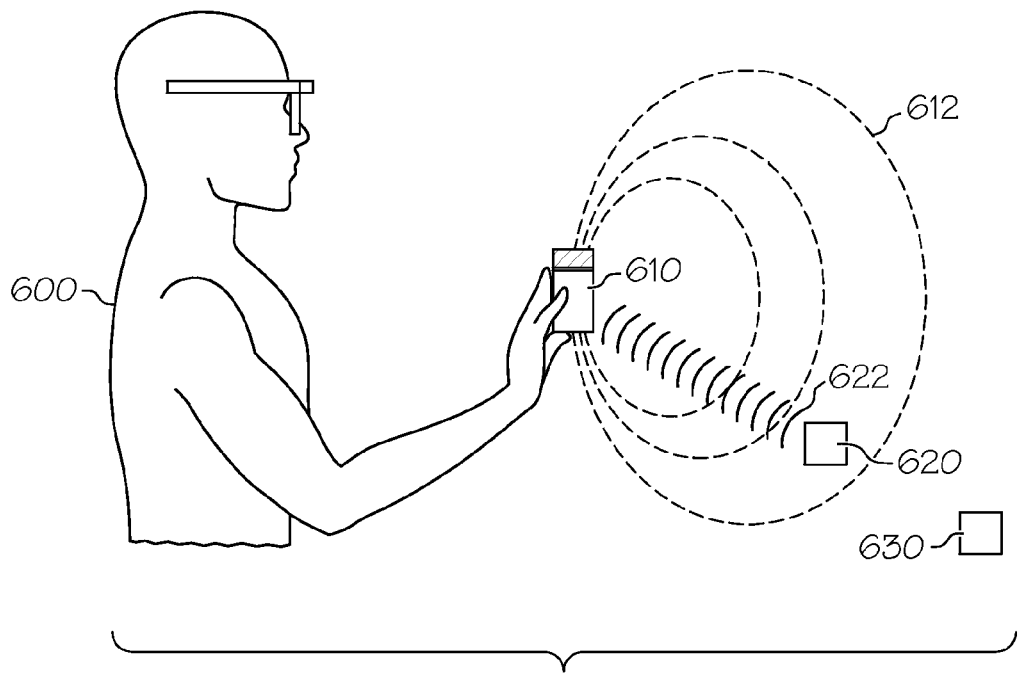
FIG. 11 is a diagram of an embodiment of a mobile unit controlled by a head tracking technique operating in a first state.
Figure 12:
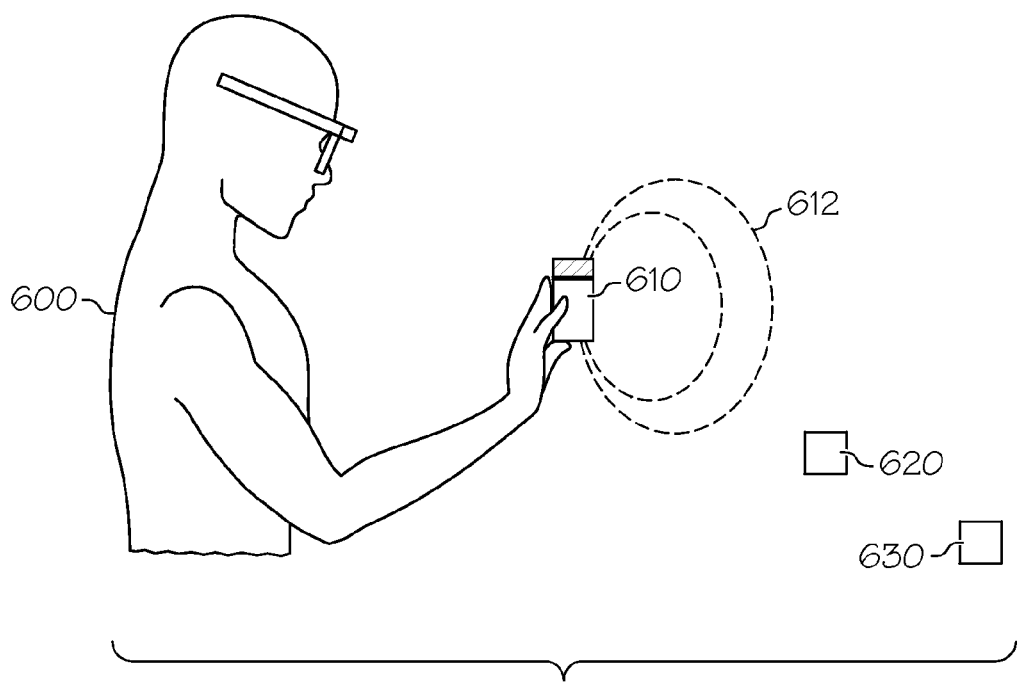
FIG. 12 is a diagram of the embodiment of FIG. 11 operating in a second state.
Figure 13:
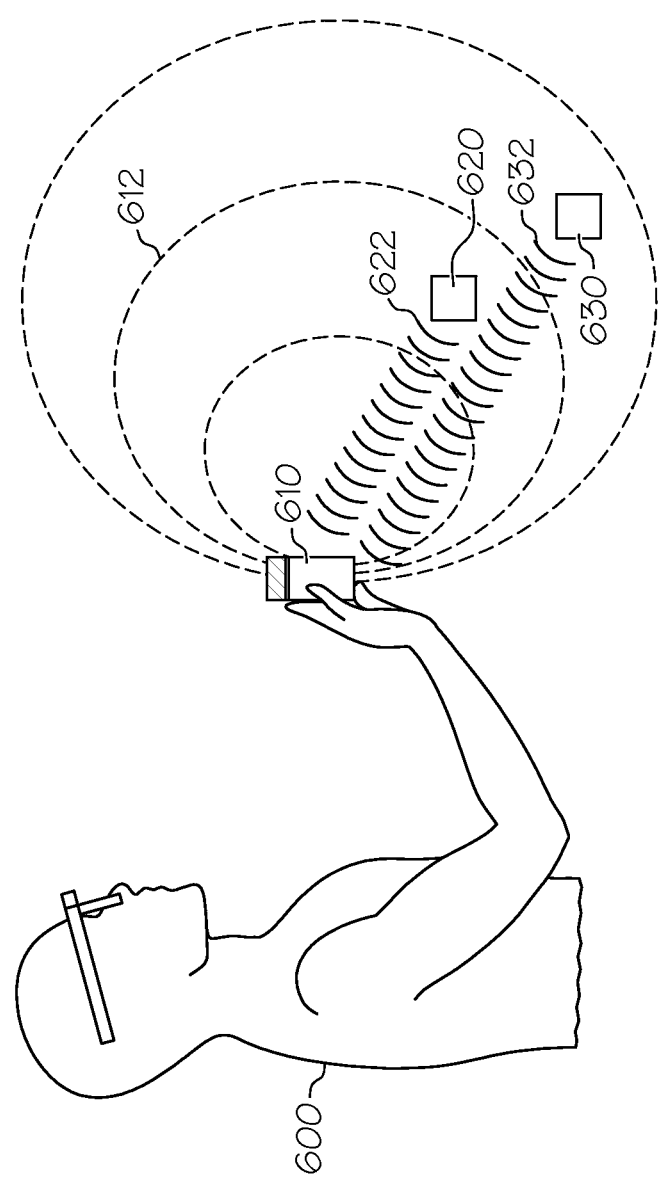
FIG. 13 is a diagram of the embodiment of FIG. 11 operating in a third state.

FIGS. 11-13 illustrate a sequence of head motions by the user 600. A mobile RFID reader 610 can adjust its operation in response to the head motions and consequent gesture commands determined from the user 600. First and second RFID tags 620, 630 are present near the mobile RFID reader 610, with the first RFID tag 620 nearer the mobile RFID reader 610 than the second RFID tag 630.

As shown in FIG. 11, during normal operation, the mobile RFID reader 610 can transmit an interrogation signal 612 to an interrogation field. The first RFID tag 620, positioned to receive the interrogation signal 612 can response with a first response signal 622. The interrogation signal 612, however, lacks sufficient signal strength to be received by the second RFID tag 630, which is outside the interrogation field.

In FIG. 12, the user 600 has moved his head downward, which can be determined by the mobile RFID reader 610 through any appropriate head-tracking technique, such as those described above. For clarity, depiction of the visor emitters and lines of illumination are not shown. The downward motion of the head can correspond to a gesture command indicating a reduction in signal strength. As shown, the mobile RFID reader 610 can transmit a weaker interrogation signal 612 to a smaller interrogation field. Accordingly, both the first and second RFID tags 620, 630 can be outside the interrogation field and fail to receive the interrogation signal 612.

In FIG. 13, the user 600 has moved his heard upward, which can correspond to a gesture command indicating a desired increase in signal strength. The increase can be on a scale, such as where signal strength is determined relative to the level position of the head of the user. In some embodiments, gesture command can indicate steps, such as where repeated upward movements of the head can correspond to transmission of sequentially increasing signal strength.

Regardless, for purposes of illustration, the upward movement of the head of the user 600 is depicted as indicating a desired signal strength of the interrogation signal 612 as exceeding that shown in FIG. 11. Accordingly, both the first and second RFID tags 620, 630 are within the interrogation field, receive the interrogation signal 612, and can transmit first and second response signals 622, 632 to the mobile RFID reader 610. As with previously described embodiments, the information obtained from the response signals can be appropriately displayed to the user.

Combinations and permutations of different described embodiments are also contemplated. For example, while upward and downward motions of the head are described for the purpose of adjusting the signal strength of a RFID reader, they can also indicate desired interoperation with higher- or lower-elevation fixed RFID readers, such as in the context of FIGS. 9 and 10. Similarly, in certain embodiments, left and right motions of the head can adjust signal strength of a transmitted RFID interrogation signal, or a desire for steering or directional adjustment of an RFID interrogation field, as previously described. The selection of operational modes or configurations of a RFID reader can be accomplished through manual input, or contextual operation, as appropriate to the embodiment.

Additionally, information returned from RFID operations can be presented to the user and/or stored or recorded in the RFID reader or other device. Moreover, some embodiments of a RFID reader can be configured or adapted to present information in a manner which simulates or recreates the manner in which it was collected.

For example, with reference to FIGS. 11-13, after response signals have been received from the first and second RFID tags 620, 630, information contained within the tags can be presented to the user on the display unit. To assist the user in determining relative distance from the RFID reader, the presented information can be filtered or displayed in a manner influenced by head motions and gesture commands from the user. Thus, a user could receive information from both the first and second RFID tags 620, 630 on the display of the mobile RFID reader 610. As one or more downward head movements are made, information corresponding to the second RFID tag 630, the more distant of the two, can be filtered, removed, augmented, or otherwise adjusted to indicate that the decreasing signal strength associated with the downward head movements would result in an interrogation field which did not include the second RFID tag 630.

Similarly, starting from a blank or empty display, upward head movements can introduce first the first RFID tag 620, and subsequently the second RFID tag 630 to correspond to an increasing interrogation field which first provides a response signal to the mobile RFID reader 610 from the first RFID tag 620, and subsequently, the second. Other filtration, adjustment, and information display manipulation techniques can be used which correspond to head motions, movements, and gestures, without limitation.

Figure 14:
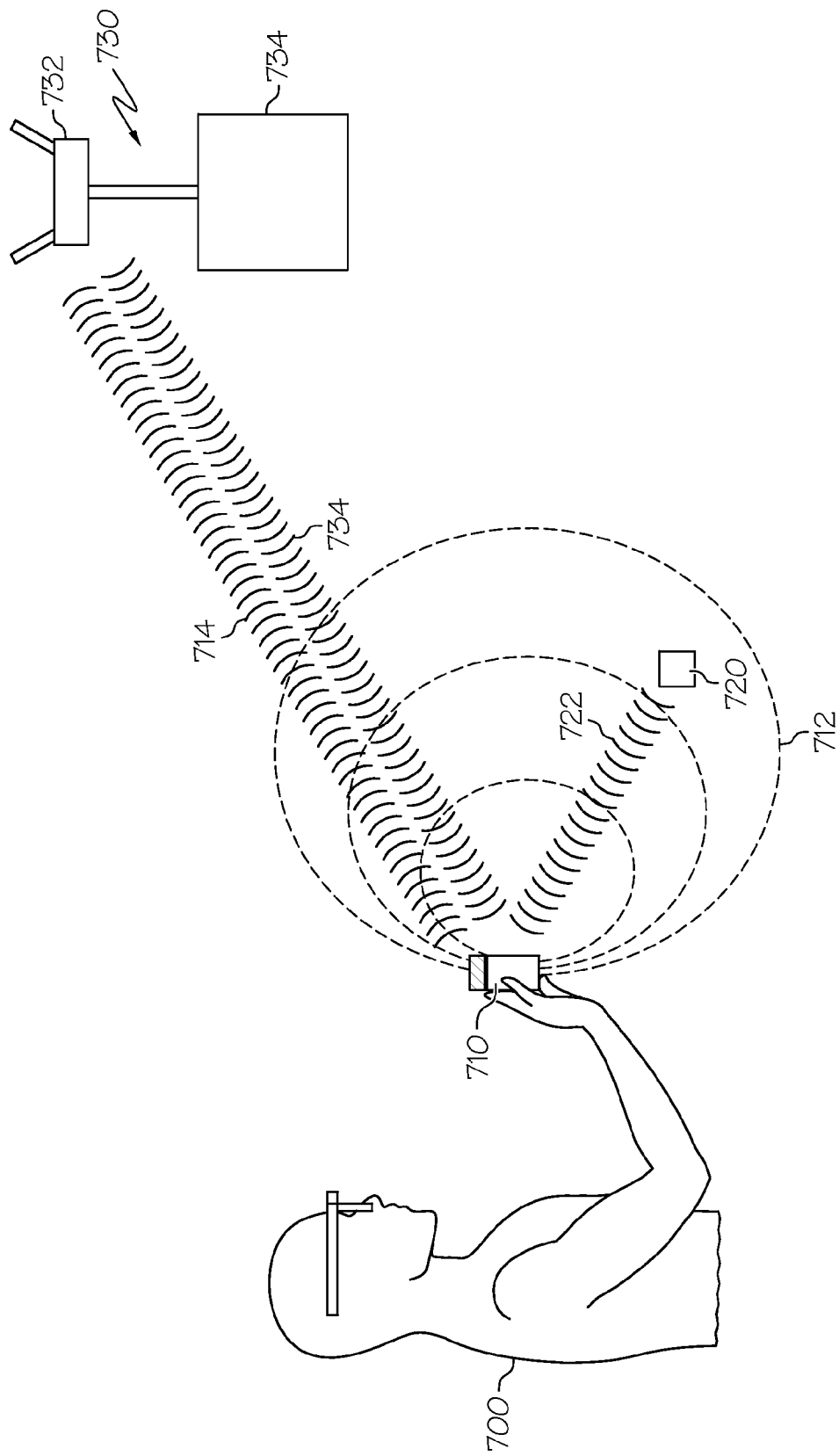
FIG. 14 is a diagram of an embodiment of a mobile unit controlled via a head tracking technique operating in cooperation with a remote computing system.
Figure 15:
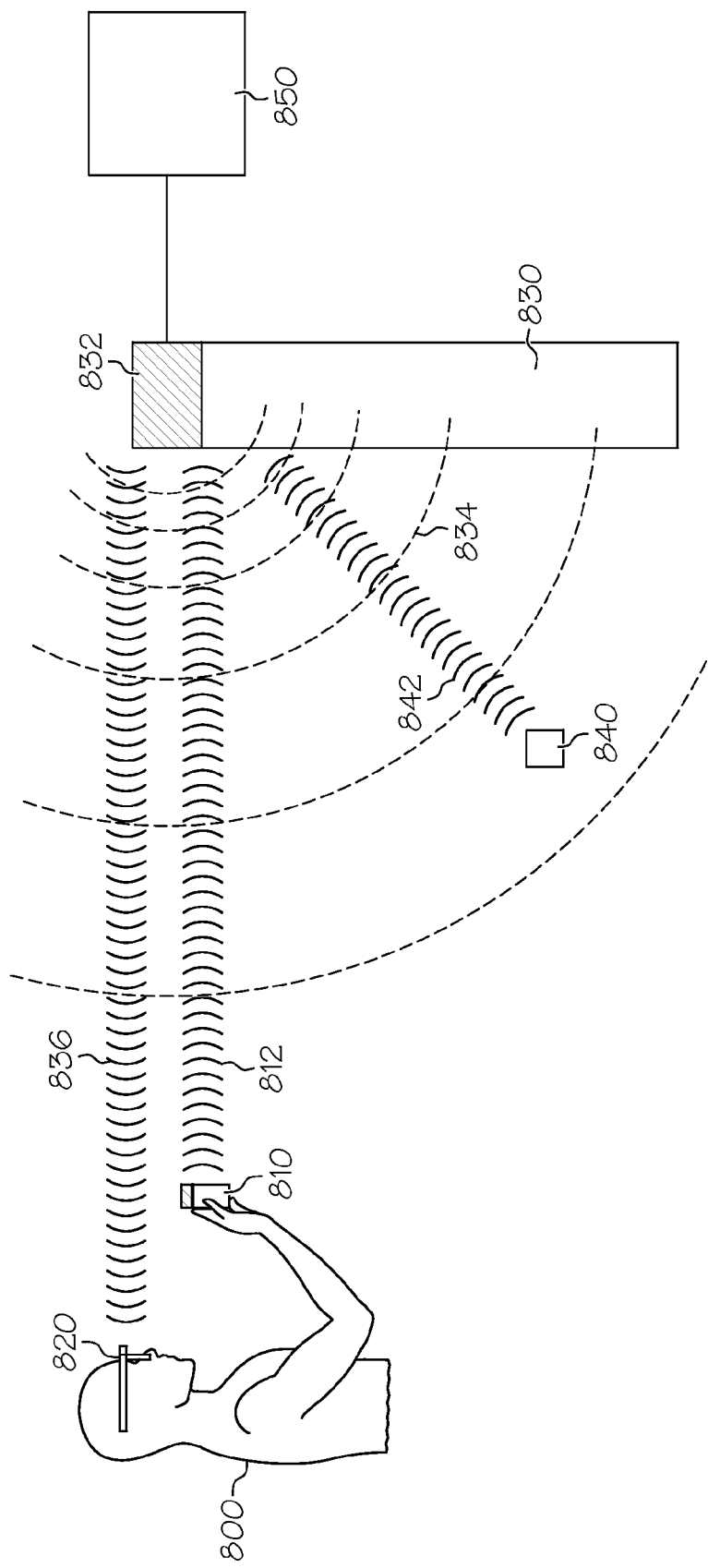
FIG. 15 is a diagram of another embodiment of a mobile unit controlled via a head tracking technique interoperating with fixed RFID equipment and a remote computing system.

FIGS. 14 and 15 illustrate a technique for displaying not only information from RFID tags, but also information associated with information from RFID tags. In FIG. 14, a user 700 operates a mobile device 710, such as a RFID reader with head tracking features and location features, including those previously described.

The user 700 can operate the mobile device 710 to transmit an interrogation signal 712 to an interrogation field. The interrogation signal 712 can be received by an RFID tag 720, which can transmit a response signal 722. After receiving the response signal 722, the mobile device 710 can commit to memory information conveyed by the response signal 722, including the fact of the response signal. Additionally, the information can be presented to the user 700.

In addition to these operations, and others, which can include those described above, the mobile device 710 can transmit a first signal 714 to a remote information system 730. The remote information system 730 can comprise a wireless communication apparatus 732 as well as an information storage system, such as the database system 734. The wireless communication apparatus 732 can be a wireless antenna, including an access point or radiofrequency antenna, or other system or device for wirelessly communicating with the mobile device 710. The database system 734 can be a computing containing any appropriate or desired type of database system for use with information storage and retrieval. In certain embodiments, the wireless communication apparatus 732 and database system 734 can be an integrated device or system.

The first signal 714 can include information obtained from the response signal 722, such as a serial number or model number of a piece of merchandise associated with the RFID tag 720. In response to receiving the first signal 714, the remote information system 730 can obtain information related to the information conveyed by the first signal 714, referred to as contextual information. In the example where the model number is conveyed by the response signal 722, a further example of related, contextual information can be information related to the model number, such as features or the number of stocked units, and so on. The wireless communication apparatus 732 can receive the first signal 714, and the contextual information can be retrieved from the database system 734. The contextual information related to the RFID tag 720 can be provided to the mobile device 710 via a second signal 736 from the remote information system 730. The contextual information can then be displayed to the user 700 by a display component of the mobile device 710. In certain embodiments, the information associated with the RFID tag 720 can be stored locally on the mobile device 710.

FIG. 15 illustrates a system in which a user 800 operating a mobile device 810 and wearing a visor 820 receives information, including contextual information, based on his head movements. The mobile device 810 can interoperate with a nearby fixed RFID device 832 to determine the presence and identity of nearby RFID tags and to retrieve and display contextual information regarding the tags to the user 800.

The mobile device 810 can determine head movements and gesture commands from the user 800 using any technique or approach previously described. Through head movement, the user 800 can provide information to the device indicating a region, area, or field in which RFID operations should be performed. For example, by looking toward a particular fixed device, including the fixed RFID device 832, the user 600 can indicate interest or desire for the appropriate device to perform RFID operations, including interrogation of nearby RFID tags and reporting information and contextual information, determined from the interrogation and related operations.

The mobile device 810 can then communicate with the appropriate fixed RFID device 832 by sending a first signal 812. The first signal 812 can identify the desired fixed RFID device 832 to perform RFID operations in those embodiments where multiple fixed devices are present. The mobile device 810 can determine the appropriate fixed RFID device by monitoring its location and movement, using GPS or gyroscopic devices, or other appropriate techniques.

In certain embodiments, the fixed RFID device 832 or other remote computing system can perform head tracking operations instead of the mobile device 810. For example, as previously described, the fixed RFID device 832 can determine when the user 800 has his head oriented toward the fixed RFID device 832. In response the fixed RFID device 832 can perform RFID operations. Where multiple fixed RFID devices are present in an area, only the fixed device at which the user 600 has oriented his head will perform RFID operations. In such embodiments, the mobile device 810 can be used for information display, and the first signal 812 can be omitted.

In response to the first signal 812, the fixed RFID device 832 can transmit an interrogation signal 834 to an interrogation field. For descriptive purposes, a single RFID tag 840 is illustrated, although many tags can be within the interrogation field. In response to receiving the interrogation signal 834, the RFID tag 840 can transmit a response signal 842 to the fixed RFID device 832. The fixed RFID device 832, upon receiving the response signal 842 can extract any useful information from the response signal 842, such as the identity of the RFID tag 840, and peripheral information, such as the type of unit of merchandise to which the RFID tag 840 is attached, its serial number, and so on.

The fixed RFID device 832 can then communicate with a remote information system 850, which can include any type of computing device or system. The remote information system 850 preferably comprises an information storage system, such as a database system, program, or device. The fixed RFID device 832 and the remote information system 850 can communicate using any appropriate technique, such as wireless information exchange, wired communication, communication through a network, such as the Internet, or any other appropriate coupling. In certain embodiments, the remote information system 850 can be local, instead of remote, and integrated with or accessible by the fixed RFID device 832.

The fixed RFID device 832 can interoperate with the remote information system 850 to obtain contextual information related to the information determined from the response signal 842. For example, when a serial number is conveyed by the response signal 842, the contextual information could include the type of unit or device to which the serial number corresponds, its manufacture date, transportation and/or logistical history, expiration date (where applicable), price information, manufacturing location, and so on. As another example, where a unit of merchandise is present in a retail environment, the contextual information presented to the user 800 can include coupons related to purchase of the unit to which the RFID tag 800 is affixed, its current price, and so on.

The contextual information can be provided to the user 800 via the mobile device 810. A second signal 836 can be transmitted to the mobile device 810 from the fixed RFID device 832. Although the first and second signals 812, 836 are illustrated as wireless signals, in some embodiments, they are signals sent through wires, such as along network cabling, or any other appropriate data transmission technique. The second signal 836 can convey the contextual information to the mobile device 810 which can, in turn, present it to the user 800.

Although the fixed RFID device 832 is shown elevated on a mount 830, in different embodiments, the fixed RFID device 832 can be attached to a wall or other building fixture, such as a ceiling or shelving. The fixed RFID device 832 is preferably stationary relative to the user 800 and RFID tag 840, regardless of its positioning.

In certain embodiments, the mobile device 810 can directly communicate with the remote information system 850 using either a wireless channel or wired channel. Then, with information provided by the mobile device 810 and additional information available to the remote information system 850, the remote information system 850 can choose one or more fixed reader devices with which to perform RFID operations. The one or more fixed reader devices can forward any desired or requested RFID tag information to the remote information system 850. The remote information system 850 can then send useful RFID tag information together with context information to the mobile device 810.

In at least one embodiment, within the system, the mobile device 810 can have additional functionality as a mobile RFID reader device with the capability to communicate with RFID tags.

In certain embodiments, the mobile device 810 need not always track head position or motion. In certain modes of operation, fixed reader devices can be provided with sufficiently definite location information of the mobile device 810 that the fixed reader devices can use the information to obtain tag information nearby.

The various tasks performed in connection with methods 900, 1000 can be performed by software, hardware, firmware, or any combination thereof. For illustrative purposes, the following description of methods 900, 1000 may refer to elements mentioned above in connection with FIGS. 1-15. In practice, portions of methods 900, 1000 may be performed by different elements of the described system, e.g., a mobile RFID reader device, a RFID tag, or fixed RFID equipment. It should be appreciated that methods 900, 1000 may include any number of additional or alternative tasks, the tasks shown in FIGS. 16 and 17 need not be performed in the illustrated order, and methods 900, 1000 may be incorporated into a more comprehensive procedure or process having additional functionality not described in detail herein.

Figure 16:
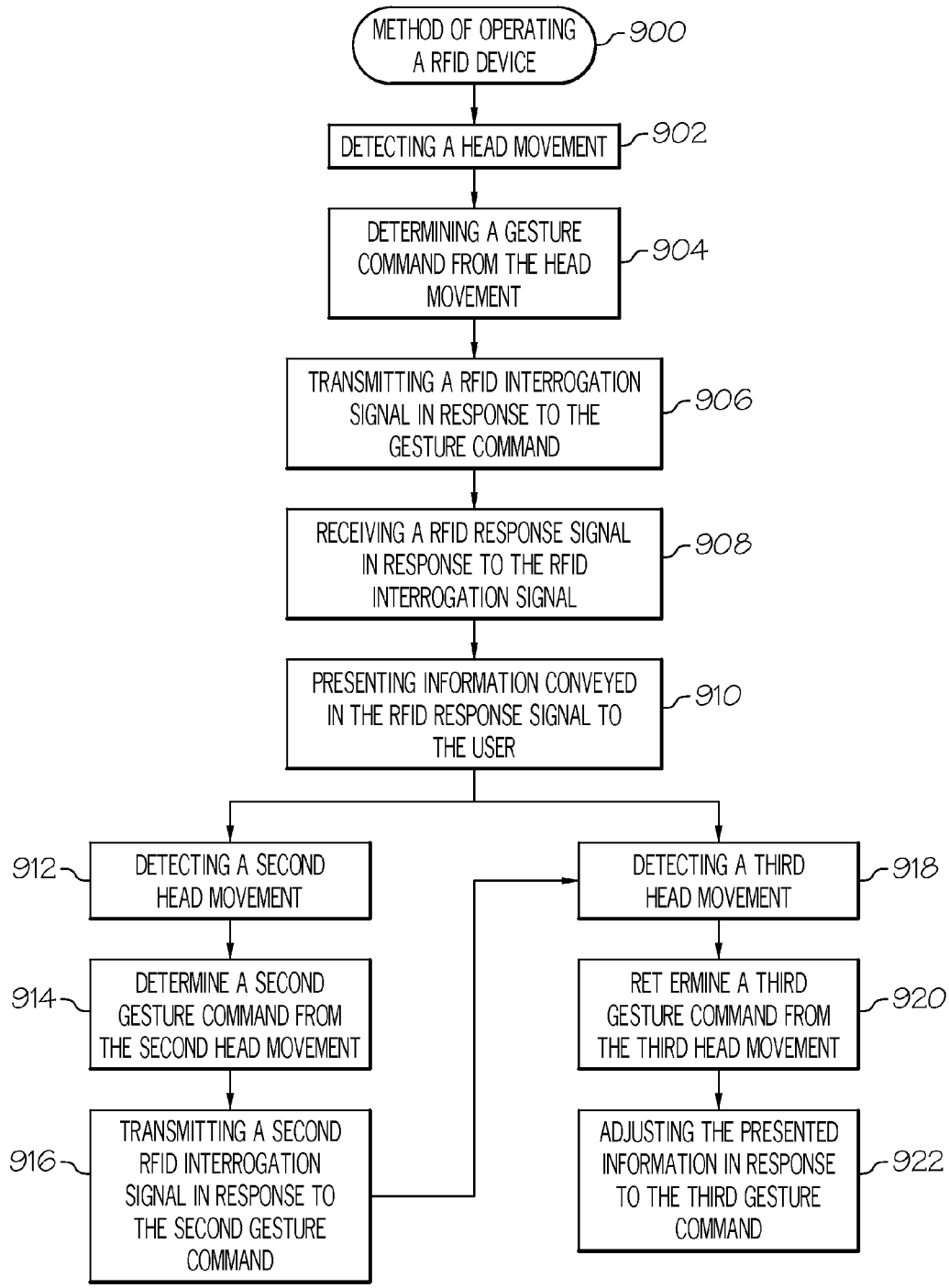
FIG. 16 is a flowchart diagram of one method of operating a RFID device.

FIG. 16 illustrates a method 900 for operating a RFID device using head tracking techniques. Using the visor approach previously described, or any other head-tracking technique, a mobile device can detect a head movement of the user (task 902). Although described in the context of a mobile device, in various embodiments, different components can perform the head tracking operations described, and a mobile device is selected for exemplary purposes only. From the particular head movement, the mobile device, or other appropriate device, can determine a gesture command (task 904). Such a command can include one which instructs the mobile device to transmit a RFID signal (task 906). Subsequently, a RFID response signal can be received from a nearby RFID tag within the interrogation field (task 908). The response signal can convey information which can be presented to the user (task 910). In some embodiments, the presence of a response signal can be presented, in addition to any information contained within the response signal.

Subsequently, further RFID operations can be performed. For example, a second head movement can be detected (task 912). In response, a gesture command can be determined from the second head movement (task 914). The second gesture command can instruct the mobile device to transmit a second RFID interrogation signal (task 916). The second RFID interrogation signal can have different characteristics than the first interrogation signal as instructed by the second head movement. For example, the second RFID interrogation signal can have a stronger or weaker signal strength, or could be adjusted to transmit to a different direction.

A third head movement can also be detected (task 918). The third head movement can convey a gesture command, which the mobile device can determine (task 920). The third gesture command can be directed to affecting the presented information (from task 910). For example, the third gesture command can instruct the mobile device to filter based on differentiated responses from RFID tags to the first and second RFID interrogation signals. Alternatively, the third gesture command could affect the presentment of information, such as instructing the mobile device to present more or fewer information entries. Thus, in response the mobile device can adjust the presented information in response to the third gesture command (task 922).

Figure 17:
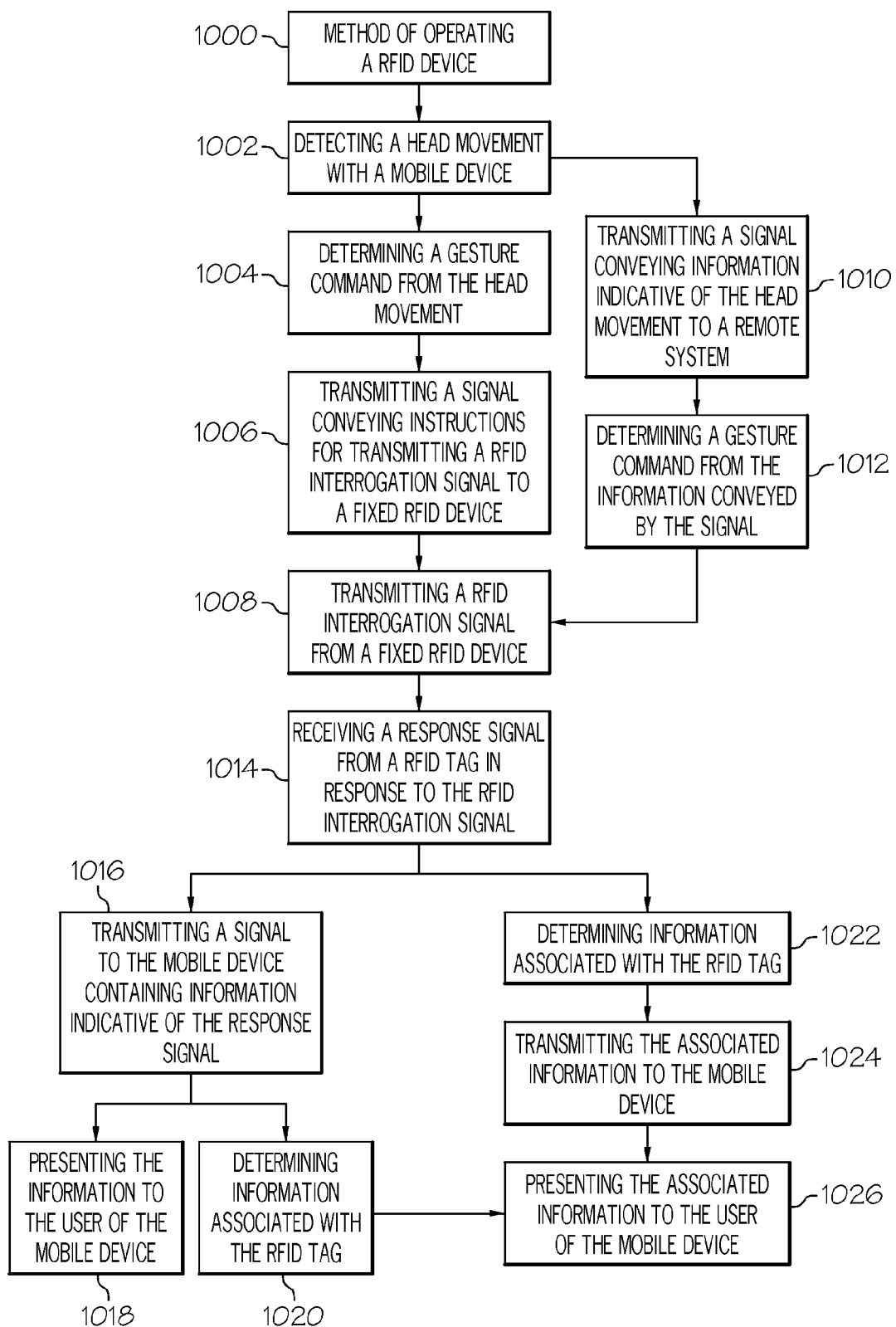
FIG. 17 is a flowchart diagram of another method of operating a RFID device.

FIG. 17 illustrates another method 1000 for operating a RFID device. Using any appropriate head tracking technique, a mobile device can detect a head movement (task 1002). In some embodiments, the mobile device can determine a gesture command from the head movement detected (task 1004). Subsequently, the mobile device can transmit a signal conveying instructions for an RFID device, such as instructions to transmit a RFID interrogation signal to a fixed RFID device (task 1006). In some embodiments, rather than determining a gesture command from the detected head movement, the mobile device can transmit a signal conveying information indicative of the head movement to a remote system (task 1008). In such an embodiment, the remote system would determine a gesture command from the head-movement information conveyed by the signal (task 1012).

Regardless of which system determines the gesture command from the head movement, the fixed RFID device can transmit a RFID interrogation signal in response (task 1008). In response, one or more nearby RFID tags can transmit a RFID response signal, which can be received by the fixed RFID device (task 1014). In some embodiments, the mobile device, if within appropriate range of the RFID tag(s), can also receive the RFID response signal. In those embodiments where the RFID response signal is received by the mobile device, the mobile device can display information conveyed by the response signal, such as the information described above.

Subsequent to receiving the response signal, in some embodiments, the fixed RFID device can transmit a signal back to the mobile device conveying information indicative of the response signal, as well as information conveyed within the response signal (task 1016). In certain embodiments, the mobile device can present the information to the user directly (task 1018). In other embodiments, the mobile device can determine information associated with the RFID tag, or associated with the information conveyed by the RFID tag in the response signal (task 1020). Such information can include contextual information obtained through previously-described techniques. After determining the associated or contextual information, the mobile device can present the information to the user (task 1026).

In certain embodiments, rather than transmitting information conveyed by the response signal, or the fact of the response signal, the fixed RFID device can instead determine information associated with the response signal, or contextual information (task 1022). Determining the related or contextual information can be accomplished through any suitable technique, such as accessing local or remote information systems in the manner previously described. Only after determining the related or contextual information associated with information from the response signal will the fixed RFID device transmit the associated information to the mobile device (task 1024). Subsequently, the associated information can be presented to the user (task 1026).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of transmitting radiofrequency identification (RFID) interrogation signals, the method comprising:
    detecting if a user's head is pointed to their left or to their right;
    transmitting a RFID interrogation signal in response to whether the user's head is pointed to their left or to their right such that when the user's head is pointed to their left the RFID interrogation signal is steered by a RFID reader to the user's left and when the user's head is pointed to their right, the RFID interrogation signal is steered by the RFID reader to the user's right;
    adjusting a strength of the RFID interrogation signal in response to detecting movement of the user's head in a vertical direction.

2. The method of claim 1, further comprising receiving a RFID response signal in response to transmitting the RFID interrogation signal.

3. The method of claim 1, further comprising: detecting a second user's head movement of the user in a second direction; and adjusting the RFID interrogation signal in response to detecting the second user's head movement.

4. The method of claim 3, wherein detecting the second user's head movement comprises detecting movement of the head of the user in the vertical direction.

5. The method of claim 4, wherein adjusting the RFID interrogation signal comprises increasing the strength of the RFID interrogation signal in response to detecting an upward movement of the user's head.

6. The method of claim 4, wherein adjusting the RFID interrogation signal comprises decreasing the strength of the RFID interrogation signal in response to detecting a downward movement of the user's head.

7. The method of claim 3, wherein adjusting the RFID interrogation signal comprises adjusting the direction of the interrogation field in response to detecting the second head movement.

8. The method of claim 7, wherein the second head movement comprises movement of the head of the user to a side, and adjusting the direction of the interrogation field comprises increasing a strength of the interrogation field in the second direction.

9. The method of claim 1 wherein the RFID reader increases a size of the interrogation field based on a direction of the user's head.

10. A radiofrequency identification (RFID) communication system comprising:
    a wireless transceiver comprising a first wireless antenna that transmits RFID interrogation signals; and
    a sensor assembly comprising:
        a sensor for detecting if a user's head is pointed to their left or to their right and to transmit a first signal conveying information indicating a first movement made by the user's head; and
        a processing architecture for receiving the first signal and to instruct the first wireless antenna to steer a RFID interrogation signal to regions of interest to the user, as indicated by an orientation of the user's head in response to the movement made by the user's head such that when the user's head is pointed to their left the RFID interrogation signal is steered by a RFID reader to the user's left and when the user's head is pointed to their right, the RFID interrogation signal is steered by the RFID reader to the user's right;
        wherein the processing architecture adjusts a strength of the RFID interrogation signal in response to detecting movement of the user's head in a vertical direction.

11. The RFID communication system of claim 10, wherein the wireless transceiver and the sensor assembly are integrally formed.

12. The RFID communication system of claim 10, wherein the wireless transceiver and the sensor assembly are separate components.

13. The RFID communication system of claim 12, wherein the wireless transceiver is adapted to be coupled to a stationary object.

14. The RFID communication system of claim 12, wherein the sensor assembly comprises a mobile device.

15. The RFID communication system of claim 14, wherein the sensor assembly further comprises a second wireless antenna.

16. The method of claim 10 wherein the RFID reader increases a size of the interrogation field based on a direction of the user's head.

17. A method of transmitting signals, the method comprising: detecting if a user's head is pointed to their left or to their right;
    steering an interrogation signal based on if the user's head is pointed to their left or to their right such that when the user's head is pointed to their left the interrogation signal is steered by a reader to the user's left and when the user's head is pointed to their right, the interrogation signal is steered by the reader to the user's right;
    adjusting a strength of the interrogation signal in response to detecting movement of the user's head in a vertical direction;
    receiving a response signal conveying identification information;
    determining contextual information associated with the identification information; and
    presenting the contextual information to the user.

18. The method of claim 17, wherein determining contextual information comprises retrieving information from a remote system.

19. The method of claim 17, wherein detecting comprises detecting the user's head movement with a mobile device.

20. The method of claim 19, wherein transmitting the interrogation signal comprises transmitting the RFID interrogation signal from a RFID reader.

21. The method of claim 17 wherein the reader increases a size of an interrogation field based on a direction of the user's head.

* * * * *